Nov. 1, 1932.       C. E. VEST       1,886,209
REEL
Filed Dec. 15, 1930       3 Sheets-Sheet 1
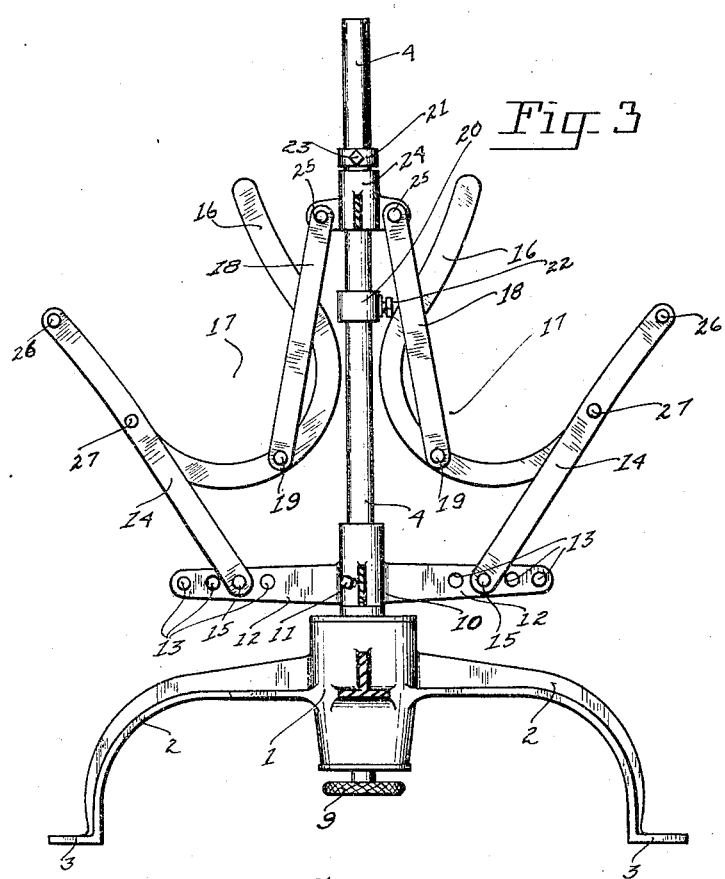
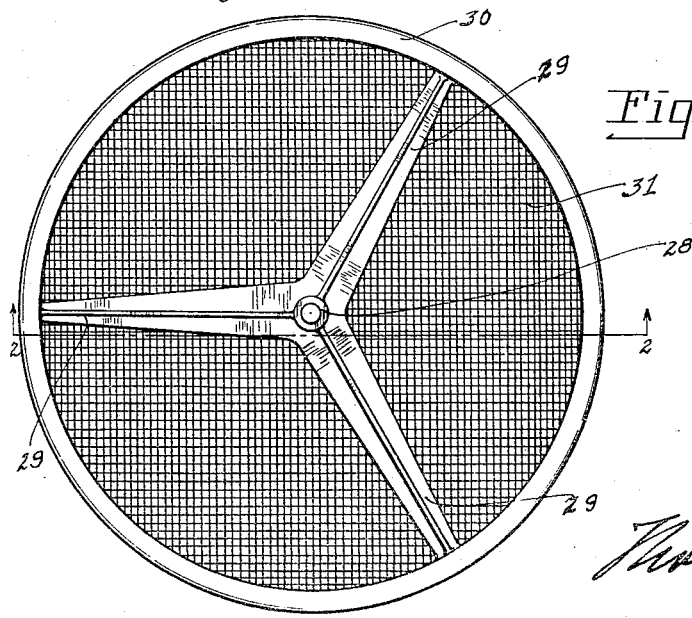
Clarence E. Vest
INVENTOR
BY
ATTORNEY Nov. 1, 1932. C. E. VEST 1,886,209
REEL
Filed Dec. 15, 1930   3 Sheets-Sheet 2

Clarence E. Vest
INVENTOR

ATTORNEY

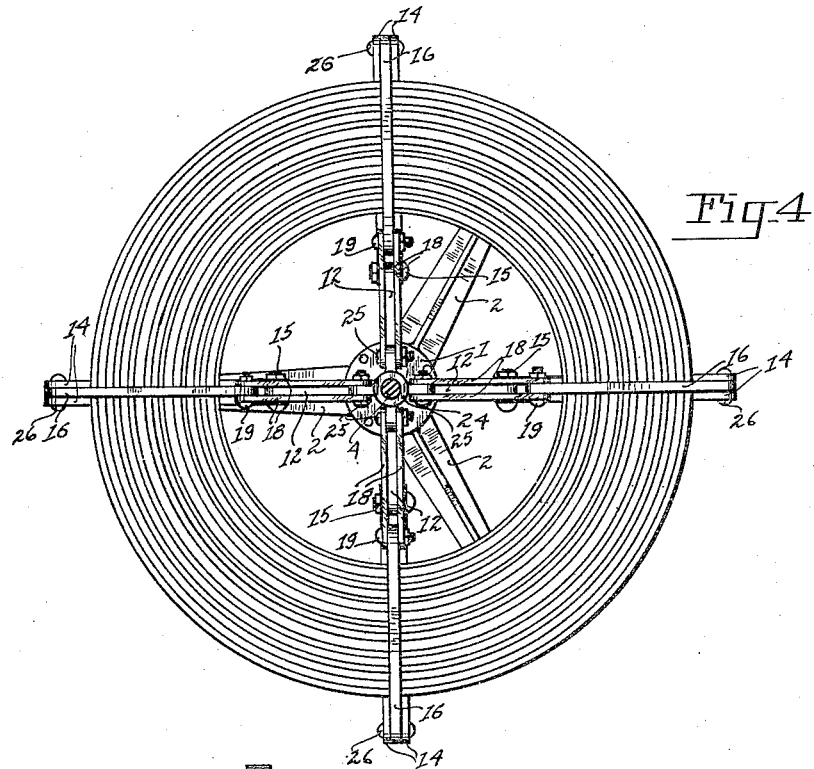
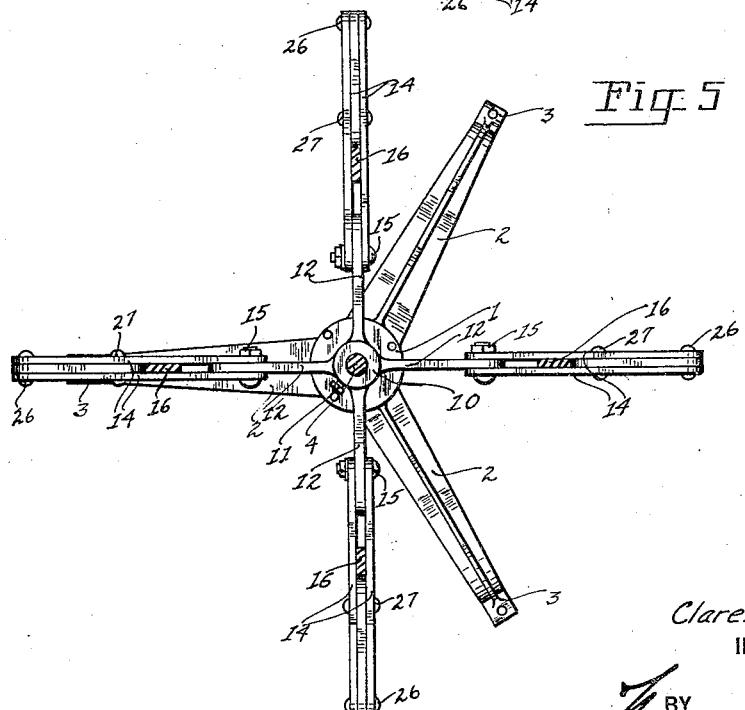

Patented Nov. 1, 1932

1,886,209

UNITED STATES PATENT OFFICE

CLARENCE E. VEST, OF TROUTDALE, OREGON

REEL

Application filed December 15, 1930. Serial No. 502,467.

My invention is primarily intended as a holder for telephone, telegraph wires, or electric transmission wires and placing and replacing of telephone and telegraph wires and cables.

I do not wish to be limited in the application of my device for this service, as the same may be used with equal facility for the dispensing of any and all lines, for every purpose, and made from various materials.

The invention consists primarily of a base having a shaft vertically rotatable within the base and upwardly extending therefrom and having means associated with a shaft and the base for frictionally regulating the rotation of the shaft relative to the base.

A spider is fixedly positioned upon the shaft and a pair of collars are disposed upon the shaft, each of which is secured to the shaft by independent fastening means to position the collars at desired placement. A cradle is formed the bottom links of which are secured to the spider with adjustable means being provided for predetermining the position of the cradle elements relative to that of the shaft and the spider. A link is disposed between the cradle and the movable collar disposed upon the shaft, the cradle being adapted for being raised to facilitate the placement of the reel of line thereupon and when lowered to stretch the reel and maintain the same in a taut condition. A protecting shield or hood is disposed upon the shaft and positioned by one of the collars.
I preferably form the hood, or shield, of a wire mesh, or screen, through which the condition of the reel and cradle may be observed as the same is being used.

The primary purpose and object of my invention is for the commercial laying of telephone, telegraph and other lines.

A further object of my invention consists in providing a reel that will occupy a minimum of space, and through the use of which, a number of lines may be simultaneously released from a vehicle and the lines be maintained relatively taut and free from entanglement.

A further object consists in providing a reel for the purpose intended, that is comprised of few parts and one that may be used over relatively long periods, with a minimum of mechanical annoyances.

With these and incidental objects in view, the invention consists in certain novel features of construction and combination of parts, the essential elements of which are set forth in the appended claims, and a preferred form of embodiment of which is hereafter described with reference to the drawings which accompany and form part of the specification.

In the drawings:

Fig. 1 is a top view of one of my new and improved devices.

Fig. 3 is a fragmentary sectional side view of the reel illustrating the cradle in position for having a reel of wire or cable, placed thereupon, or removed therefrom.

Fig. 4 is a sectional, top plan, view of the device, the same being taken on line 4—4 of Fig. 2.

Fig. 5 is a sectional top view of the mechanism, illustrated in Fig. 2, the same being taken on line 5—5 of Fig. 2, looking in the direction indicated.

Like reference characters refer to like parts through the several views.

Figure 6:
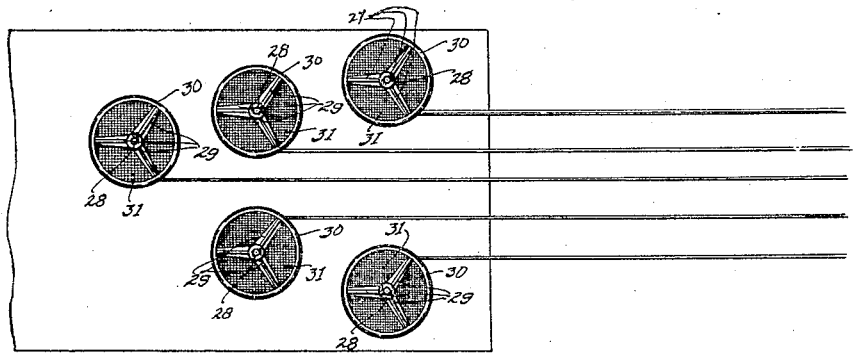
Fig. 6 is a plan view of a vehicle in which a number of my new and improved reels are placed and illustrating the same in the spending of lines therefrom, here shown as 5 in number.

1 is a base. Each arm of the base being superposed supporting legs 2. A foot 3 is disposed at the bottom of the leg through which any suitable fastening means may be passed to secure the device in placement.

A shaft 4 is vertically disposed within the base, bearings 5 and 6 are disposed within the base and in which the shaft is journaled. The engaging surfaces of the shaft with the bearings are preferably tapered, as illustrated at 7, and 8, and an adjusting wheel 9 is secured to the lower end of the shaft to frictionally control the rotation of the shaft within the bearings.

A spider 10 is fixedly positioned upon the shaft and is secured thereto by any suitable fastening means, as by a set screw 11.

Arms 12 outwardly extend from the hub and a plurality of adjusting spaced holes 13 are disposed within the arms, into which the base 14 of the cradle is journaled, the same may be journaled by any suitable journal pins 15.

A curved arm 16, upwardly extends from the base 14, to form a cylindrical enclosure 17, into which the reel, or skein of material to be placed, upon the reel, is held.

A link 18 is secured to the curved arm 16 by any suitable means, as through the use of a journal pin 19.

Collars 20 and 21 are spaced apart and secured to the shaft 4, by any suitable fastening means, as by set screws 22 and 23.

A collar 24 is slidably disposed upon the shaft and is limited in its movement by the position of the collars 20 and 21. The link is hingedly secured to the collar 24 by a journal pin 25. The base links, comprising the cradle are preferably formed, 4 in number, with the curved arm 16 disposing therebetween, and fastened in place by rivets 26 and 27. The thickness of the curved arm 16 is preferably slightly greater than the thickness of the arms 12 of the spider in order that a free hinging action may be secured by the cradle assembling about the spider arms.

A hood is disposed about the shaft, the same being comprised of a hub 28 and arms 29. A rim 30 is disposed at the outer end of the arms 29 and the interstices are sealed by a screen assembly 31, the purpose of which is to facilitate inspection and observation of the operation of the reel as the material is unwound therefrom.

Figure 2:
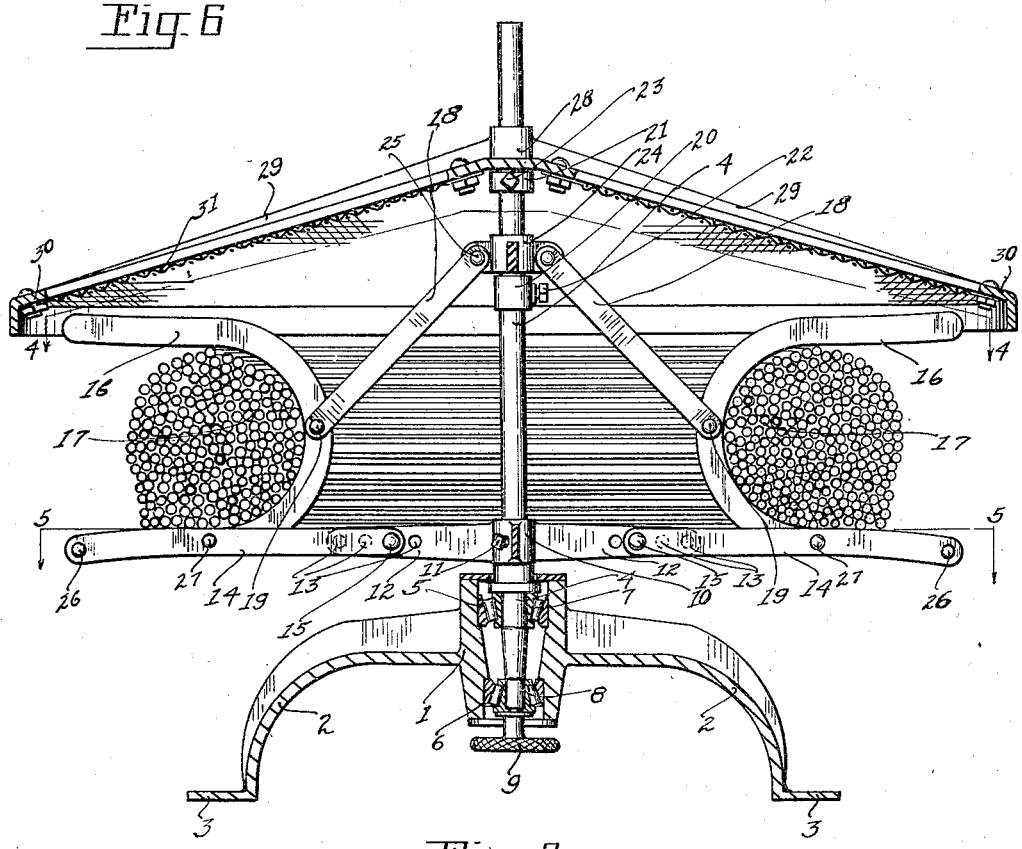
Fig. 2 is a sectional side view of assembled device, illustrating the reel in position for operation, the same being taken on line 2—2 of Fig. 1 looking in the direction indicated.

In the operation of my device the cradle is shown in unwinding position as illustrated in Fig. 2. When placed in this position the material may be freely unwound therefrom. When a skein or reel is to be placed upon, or removed from the cradle, the same is placed in the position as illustrated in Fig. 3.

During the placing and removing of reels of material from the cradle, the hood structure is removed from the shaft.

While the form of mechanism herein described may be successfully used in the carrying out of my method, I do not wish to be limited to the specific form of mechanism herein shown and described as any form of mechanism may be used that is adapted to the carrying out of my method, all coming within the scope of the claims which follow.

What I claim is:

1. In a device of the class described, the combination of a base, legs having feet disposed upon the lower end thereof outwardly disposed relative to the base and secured thereto, journal bearings disposed within the base, a shaft vertically disposed within the base and journaled within the bearings, manually adjustable means for limiting the freedom of rotation of the shaft, a spider disposed upon the shaft and secured thereto, arms outwardly extending from the spider hub, adjusting holes disposed within the arms, a cradle base hingedly secured to the arms, cradle arms upwardly extending from the cradle base and secured thereto, a collar adjustably disposed upon the shaft, links disposed between the cradle arms and the adjustable collar, and collars disposed upon the shaft adapted for limiting the movement of the adjustable collar.

2. In a device of the class described, in combination, a base, a rotatable shaft vertically disposed centrally of the base, means disposed within the base for controlling the rotation of the shaft, a spider fixedly disposed about the shaft and above the base, arms extending outwardly therefrom, a cradle base hingedly secured to the arms, cradle arms extending upwardly and secured to the cradle base, a collar slidably disposed upon the shaft, links hingedly secured to the cradle arms and the collar, said links disposed therebetween, and means disposed upon the shaft for limiting the movement of the collar.

CLARENCE E. VEST.